United States Patent [19]
Polen et al.

[11] 3,899,034
[45] Aug. 12, 1975

[54] WEIGHING SYSTEM

[75] Inventors: Karl Polen; J. C. Ottle, both of Alliance, Ohio

[73] Assignee: The Alliance Machine Company, Alliance, Ohio

[22] Filed: Dec. 6, 1973

[21] Appl. No.: 422,551

[52] U.S. Cl. ............................... 177/151; 177/255
[51] Int. Cl. ............................................. G01g 23/02
[58] Field of Search ................... 177/151, 255, 163

[56] References Cited
UNITED STATES PATENTS

| | | | |
|---|---|---|---|
| 2,867,433 | 1/1959 | Bergenheim et al. | 177/209 X |
| 3,252,532 | 5/1966 | Richards | 177/255 |
| 3,331,458 | 7/1967 | Van Daden et al. | 177/209 X |

Primary Examiner—George H. Miller, Jr.
Attorney, Agent, or Firm—Buell, Blenko & Ziesenheim

[57] ABSTRACT

A novel weighing system for material handling apparatus. The system utilizes a plurality of fixed and movable load cells arranged in a stable three-point configuration. Uneven distribution of the material does not affect the stability of the system and an accurate weight of the material is determined.

5 Claims, 5 Drawing Figures

WEIGHING SYSTEM

This invention relates to a weighing system which utilizes both fixed and movable load cells. The weighing system is used with material handling apparatus which convey loads which are unevenly distributed over the material handling surface. The weighing system eliminates inaccurate readings of the weight caused by the uneven load distribution.

Weighing systems are commonly used with material handling devices such as ladle crane hangers, scrap chargers and conveyors. A weighing system in conjunction with a ladle crane hanger permits the operating personnel to know how much molten steel is initially in the ladle and how much remains after each pouring. This information enables the operators to determine when there is not enough molten steel remaining for another ingot and thereby prevents the waste of an ingot due to an insufficient amount of metal. In scrap chargers the weight of the scrap to be added to the furnace is determined and on conveyor systems the weight of the material loaded for transport is determined. In addition use of a weighing system incorporated into a scrap charger or conveyor eliminates the need for a separate weighing operation and the additional material handling steps attendant thereto.

Despite all the obvious advantages of using a weighing system incorporated into material handling systems such as those described, serious disadvantages exist in present systems which either render them inaccurate or completely unusable. The loads handled by ladle crane hangers, scrap chargers, conveyors and the like do not have a uniform distribution of weight over the material handling surface.

In the weighing systems presently being used, uneven load distribution render them grossly inaccurate and even unusable for many purposes. The uneven load distribution often causes the limits of a particular cell or cells to be overridden. When this occurs the reading transmitted from that particular cell or cells cannot be averaged by the counter with the readings from the other cells. Since the readings cannot be properly averaged, the resulting read out is inaccurate.

Inaccurate readings of the weight of molten steel in a ladle can result in scrap ingots due to an insufficient amount of steel. An error in the load carried by a scrap charger can result in an entire heat of steel failing to meet specifications. Similar problems arise in conveyor systems. The economic consequences of such errors can be serious. Due to these economic disadvantages and their consequences, widespread use of integrated weighing systems has been limited.

The invention of the present application overcomes the problems presented by the prior art. The invention provides a weighing system which is comprised of fixed and movable load cells at each end of the surface on which the load is contained. The plurality of cells are arranged so that they act as a stable three-point system. Two load cells are fixed and two are movable at each end. Therefore, as in a three-point system the load distribution does not affect stability. The movable cells adjust to the load distribution thereby avoiding the overloading of any cell. Thus, cells' limits are not exceeded and an accurate reading is fed from each cell to the counter. The weighing system of the present invention reduces the error factor due to uneven load distribution to a minimum.

In the foregoing general description, we have set out certain purposes, objects and advantages of our invention. It will be described hereafter and will become apparent to those skilled in the art of material weighing when considering the following description and the drawings in which.

Figure 1:
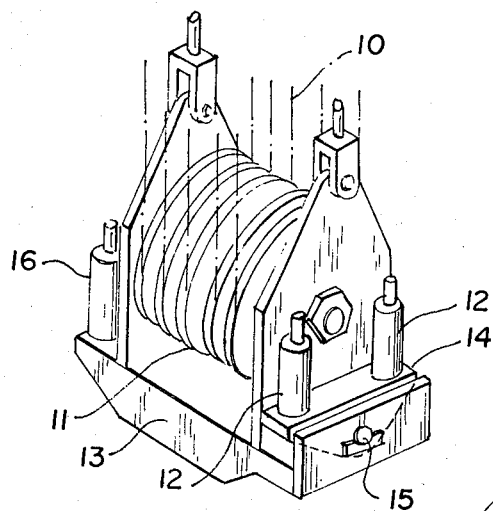
FIG. 1 is a perspective view of a lifting bracket of a ladle crane hanger employing the weighing system of the present invention.

Referring to the drawings, we have illustrated two particular material handling systems which incorporate the weighing system of the present invention.

Figure 2:
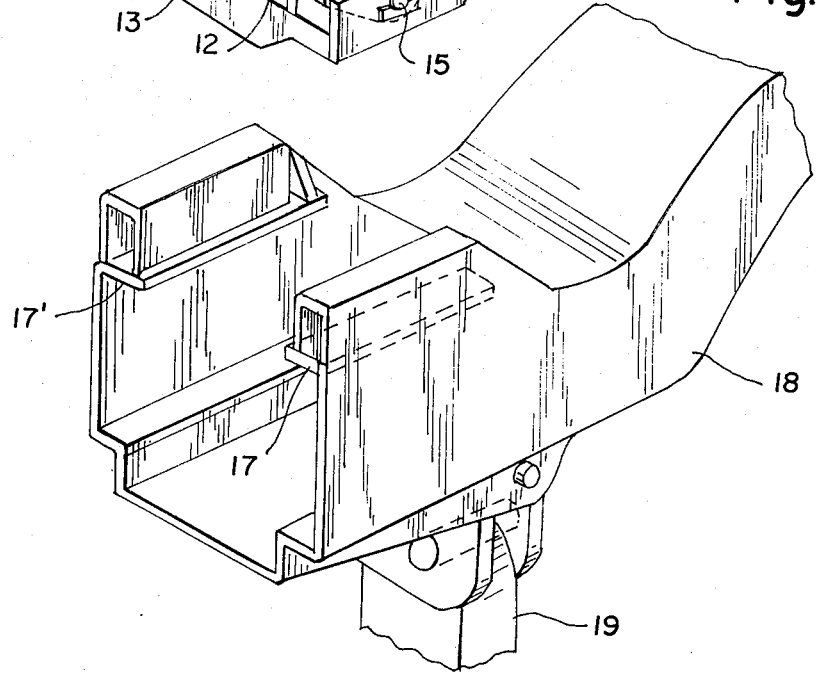
FIG. 2 is a perspective view of the left-hand portion of the hook basket of a ladle crane hanger.
Figure 3:
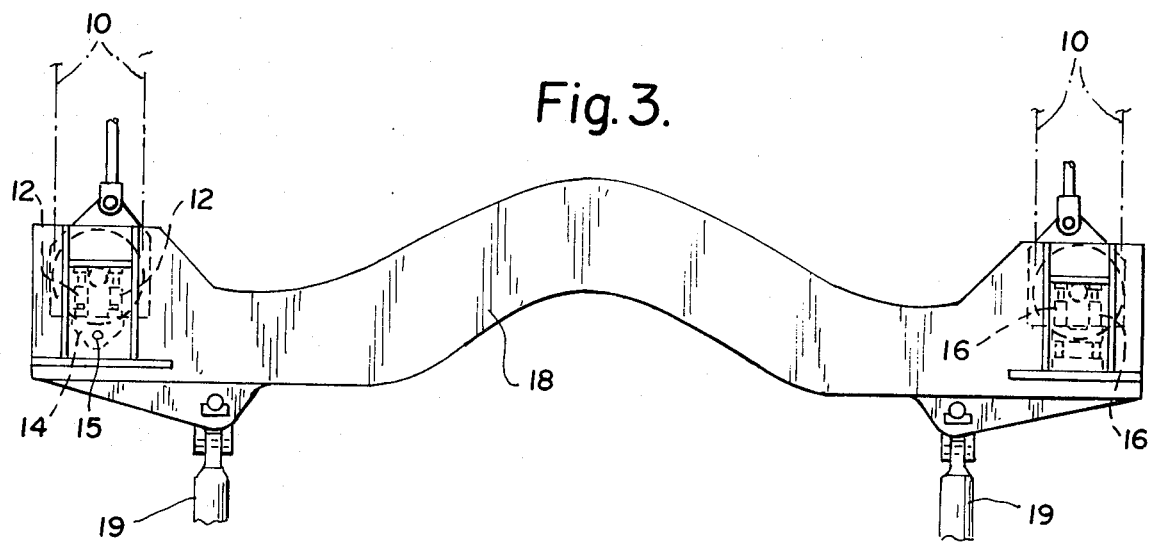
FIG. 3 is a side elevational view of a ladle crane hanger.

FIGS. 1 and 2 show the left-hand side of a typical ladle crane hanger and FIG. 3 shows a side elevational view. The lifting mechanism, FIG. 1, is inserted into the hook support section, FIG. 2, as shown in FIG. 3. Lifting ropes 10 mounted on sheaves 11 which is attached to reeving basket 13 are connected to an overhead crane (not shown). The crane moves the ladle crane hanger both horizontally and vertically. Ropes 10 generally are not perpendicular to the ground but are at a slight angle. Two movable load cells 12 are pivotally mounted on basket 13 by means of platform 14 and pin 15. Two fixed load cells 16 are mounted on basket 13, opposite movable cells 12.

Surface 17 of the hook support 18 rests on load cells 12 and surface 17' rests on load cells 16. In operation a ladle (not shown) would be lifted by means of hooks 19. The distribution of the metal in the ladle and the fact that ropes 10 are not truly vertical causes the weights supported by each hook to vary. Cells 12 are free to move in unison so that the load cells 12 and 16 are stable with relation to the load that is being supported thereon. Each cell 16 acts as one leg of the system and the cells 12 act in combination as the third leg. Therefore, no matter how the load shifts, the system is always stable.

A stable system permits the accurate measurement of the load. No one cell's limits are overridden by a disapproportionate distribution of load upon that cell. The readings from all eight cells are averaged in a commercially available counter by means well known in the art. Since no cell's limit has been overridden, correct averaging is possible and the read out of weight from the counter is accurate.

Figure 4:
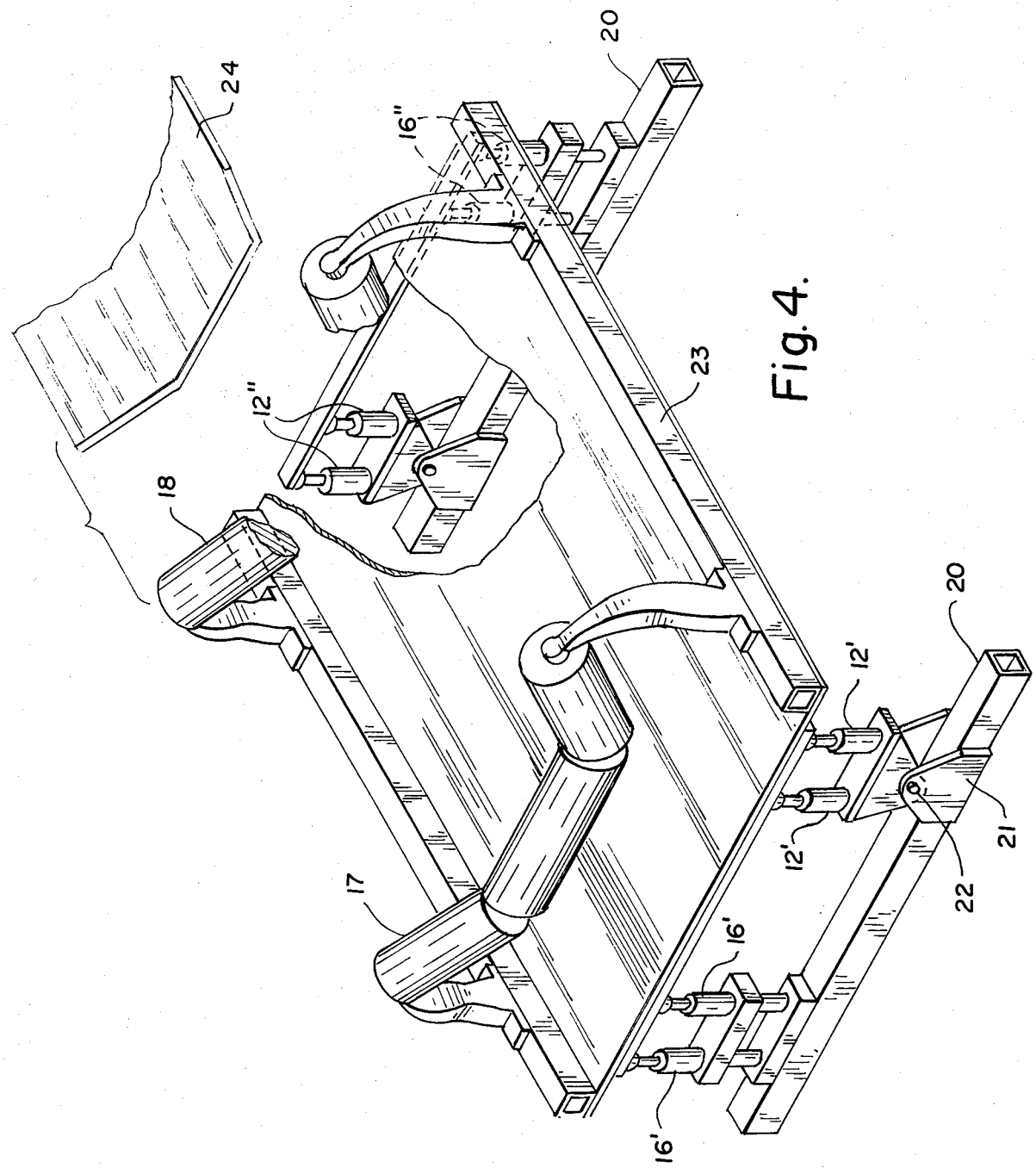
FIG. 4 is a perspective view of a belt conveyor employing the weighing system of the present invention.

FIG. 4 shows a transport conveyor incorporating the weighing system of the present invention. Two movable cells 12' are pivotally mounted on conveyor frame 20 by means of brackets 21 and pin 22. Fixed cells 16' are mounted directly on frame 20. At the opposite end of the load carrying surface movable cells 12'' and fixed cells 16'' are mounted in the same manner. Cells 12'' are opposite cells 16' and cells 16'' are opposite cells 12'. The weight of the belt frame 23 and the material carried on belt 24 is borne by the cells. Load distribution on belt 24 does not affect the stability of the system with relation to the load. With the weighing system stable in relation to the load, no cell bears a disproportionate amount of weight and no cell's limits are overridden. The load on each cell is likewise transmitted by means well known in the art to a commercially available counter averaged and the weight read therefrom. Continuous measurements of weight can be made as belt 24 travels over rollers 17, 18 and load distribution does not affect this reading.

Figure 5:
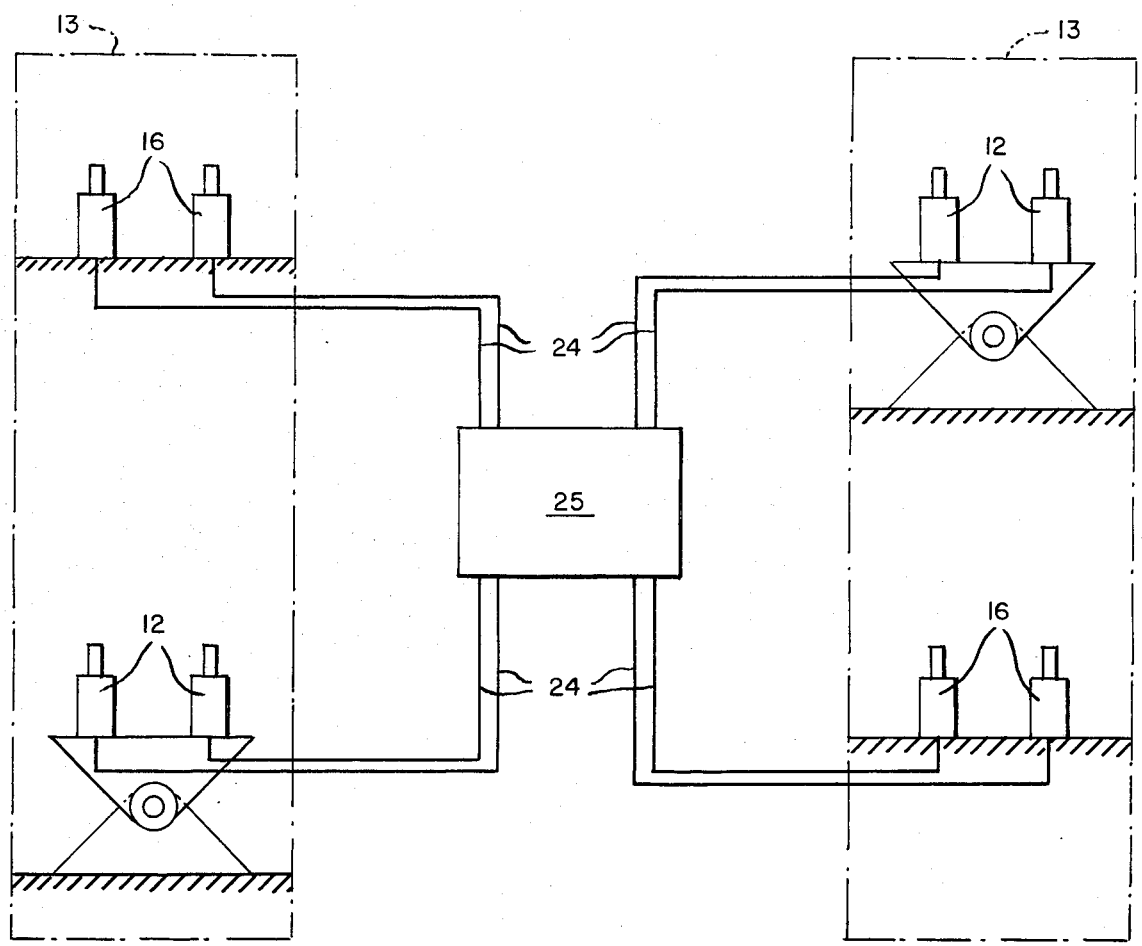
FIG. 5 is a schematic view of the load cells and averaging device recording means of the present invention.

As shown in FIG. 5 the fixed cells 16 which are mounted on basket 13 and the moveable cells 12 are connected to a commercially available high performance analogue digital convertor 25 by means of wires 24. A typical convertor is Gilmore model M710A. The convertor takes the voltage output load cells 12 and 16 and converts it to weight in pounds which can be read on its own display. The fixed and moveable cells shown in the configuration of FIG. 4 are also connected to a similar convertor by the same means.

In the foregoing specification, we have set forth two particular material handling systems incorporating the weighing system of the present invention. However, it will be understood that the weighing system of this invention may be otherwise embodied within other material handling systems within the scope of the following claims.

We claim:

1. A weighing system for material handling apparatus comprising a plurality of fixed load cells and a plurality of movable load cells, said fixed cells and said movable cells being operably connected to form a three-point system, each of said fixed cells being one of two legs of the system and one or more of the movable cells being said third leg, said cells being in operable contact with the load bearing surfaces of said material handling apparatus, means connecting said cells to an averaging device, and means for recording said average.

2. The weighing system of claim 1 wherein said system is comprised of two fixed cells and two movable cells at one extreme of the load bearing surface of the material handling system and a second set of two fixed cells and two movable cells, said second set being opposed as to fixed and movable cells at the other extreme of said weight bearing surface.

3. A weighing system for a material handling apparatus as claimed in claim 1 wherein said material handling apparatus includes a main support frame carrying said load cells and a spaced load bearing surface operably connected to said load cells.

4. A weighing system as claimed in claim 1 wherein at least two fixed cells are provided at spaced apart points, said fixed cells forming two suspension points and the movable cells forming the third suspension point.

5. A weighing system for a ladle crane hanger as claimed in claim 1 comprising a pair of fixed load cells fixedly attached to the opposing sides of each of the two reeving baskets of said ladle crane hanger, a pair of moveable load cells rotably attached to the remaining sides of each of said reeving baskets, means for connecting all of said cells to averaging means, and means for reading said averaging means.

* * * * *